(12) United States Patent
Kobayashi et al.

(10) Patent No.: US 9,893,327 B2
(45) Date of Patent: Feb. 13, 2018

(54) ELECTRIC STORAGE APPARATUS

(75) Inventors: Keiichiro Kobayashi, Nissin (JP); Taira Saito, Miyoshi (JP); Masaru Ishii, Miyoshi (JP); Masato Kamiya, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 175 days.

(21) Appl. No.: 14/379,531

(22) PCT Filed: Feb. 21, 2012

(86) PCT No.: PCT/JP2012/001162
§ 371 (c)(1),
(2), (4) Date: Aug. 19, 2014

(87) PCT Pub. No.: WO2013/124889
PCT Pub. Date: Aug. 29, 2013

(65) Prior Publication Data
US 2015/0056487 A1    Feb. 26, 2015

(51) Int. Cl.
*H01M 10/6556* (2014.01)
*H01M 2/10* (2006.01)
*H01M 10/04* (2006.01)

(52) U.S. Cl.
CPC ....... *H01M 2/1022* (2013.01); *H01M 2/1077* (2013.01); *H01M 10/0468* (2013.01); *H01M 10/0472* (2013.01); *H01M 10/6556* (2015.04)

(58) Field of Classification Search
CPC ........... H01M 2/1022; H01M 10/5061; H01M 2/1077

(Continued)

(56) References Cited

U.S. PATENT DOCUMENTS

2006/0240318 A1    10/2006  Kim et al.
2011/0052976 A1*   3/2011  Ishii ................. H01M 2/22
                                                           429/178

(Continued)

FOREIGN PATENT DOCUMENTS

CN    100452482 C    1/2009
CN    102171883 A    8/2011

(Continued)

*Primary Examiner* — James Lee
(74) *Attorney, Agent, or Firm* — Andrews Kurth Kenyon LLP (57) ABSTRACT

An electric storage apparatus includes a plurality of electric storage elements placed side by side along a predetermined direction and a restraint plate placed between two of the electric storage elements adjacent to each other in the predetermined direction. The electric storage element has a power-generating element performing charge and discharge and a case housing the power-generating element. The restraint plate has protruding portions which give a restraint force to the electric storage element and form a space between the restraint plate and the electric storage element. The power-generating element has a positive electrode plate, a negative electrode plate, and a separator placed between the positive electrode plate and the negative electrode plate. The power-generating element includes a reaction area where a chemical reaction associated with the charge and discharge occurs. The plurality of protruding portions have a first protruding portion in contact with a first area in the case and a second protruding portion in contact with a second area in the case. The first area in the case is opposite to the reaction area, and the second area in the case is opposite to the area of the power-generating element except the reaction area.

10 Claims, 9 Drawing Sheets

(58) Field of Classification Search
USPC .................................................. 429/120, 156
See application file for complete search history.

(56) References Cited

U.S. PATENT DOCUMENTS

| | | | |
|---|---|---|---|
| 2011/0070476 A1 | 3/2011 | Takahashi et al. | |
| 2012/0189902 A1* | 7/2012 | Kim .................... | H01M 2/1022 |
| | | | 429/159 |

FOREIGN PATENT DOCUMENTS

| | | | |
|---|---|---|---|
| JP | 2006-310309 A | 11/2006 |
| JP | 2008-078008 A | 4/2008 |
| JP | 2009-266413 A | 11/2009 |
| JP | 2010-097693 A | 4/2010 |
| JP | 2010-165597 A | 7/2010 |
| JP | 2010-287530 A | 12/2010 |

* cited by examiner

ELECTRIC STORAGE APPARATUS

CROSS-REFERENCE TO RELATED APPLICATIONS

This is a national phase application based on the PCT International Patent Application No. PCT/JP2012/001162 filed Feb. 21, 2012, the entire contents of which are incorporated herein by reference.

TECHNICAL FIELD

The present invention relates to an electric storage apparatus including a mechanism for giving a restraint force to a plurality of electric storage elements arranged along one direction.

BACKGROUND ART

A battery stack may be provided by arranging a plurality of cells along one direction. A restraint mechanism may be used to give a restraint force to the plurality of cells. The restraint force refers to a force which tightly holds the plurality of cells in the direction of the arrangement of the plurality of cells.

Specifically, as described in Patent Document 1, a partitioning plate is placed at a position adjacent to a cell, and a protruding portion provided on the partitioning plate is brought into contact with the cell to give a restraint force to the cell from the partitioning plate. The protruding portion is used to form a space between the cell and the partitioning plate for moving a heat exchange medium used in adjusting the temperature of the cell.

PRIOR ART DOCUMENT

Patent Document

[Patent Document 1] Japanese Patent Laid-Open No. 2010-097693

DISCLOSURE OF THE INVENTION

Problems to be Solved by the Invention

In giving the restraint force to the cell, it is desirable to give the restraint force evenly to the face of the cell which receives the restraint force. The cell accommodates a power-generating element capable of charge and discharge. In the configuration in which the restraint force is simultaneously given to a plurality of cells, the uniform restraint force needs to be given to the power-generating elements of the plurality of cells. The uniform restraint force needs to be given particularly to reaction areas of the power-generating elements where charge and discharge are performed.

The cells may have manufacturing variations. When the plurality of cells are arranged, the cells may be misaligned. In view of the manufacturing variations and the misalignment, the restraint force is preferably given only to the area of the plurality of cells where their power-generating elements (reaction areas) are placed one on another in the direction of the arrangement of the cells. This can result in equalized restraint forces applied to all the reaction areas.

When the restraint force is given only to the areas where the reaction areas are placed one on another, however, the restraint force is applied only to part of the cell, and the restraint force cannot be given to the entire face of the cell which receives the restraint force. For maintaining the input/output performance of the cell and the like, the restraint force is preferably given to the entire cell rather than part of it.

Means for Solving the Problems

According to an aspect, the present invention provide an electric storage apparatus including a plurality of electric storage elements placed side by side along a predetermined direction and a restraint plate placed between two of the electric storage elements adjacent to each other in the predetermined direction. The electric storage element has a power-generating element performing charge and discharge and a case housing the power-generating element. The restraint plate has protruding portions which give a restraint force to the electric storage element and form a space between the restraint plate and the electric storage element.

The power-generating element has a positive electrode plate, a negative electrode plate, and a separator placed between the positive electrode plate and the negative electrode plate. The power-generating element includes a reaction area where a chemical reaction associated with the charge and discharge occurs. The plurality of protruding portions have a first protruding portion in contact with a first area in the case and a second protruding portion in contact with a second area in the case. The first area in the case is opposite to the reaction area, and the second area in the case is opposite to the area of the power-generating element except the reaction area.

According to the present invention, the first protruding portion can be used to give the restraint force only to the reaction area. The restraint force can be given only to the reaction area to equalize the restraint forces applied to the reaction areas of the plurality of electric storage elements. The second protruding portion can be used to give the restraint force to the entire case including the first are and the second area, thereby preventing the restraint force from being applied only to part of the case (first area).

The first area can be defined as an area opposite to an area of the plurality of electric storage elements where the reaction areas are overlapped one another in the predetermined direction. The second area can be defined as an area not opposite to any of the reaction areas in the plurality of electric storage elements.

The positive electrode plate can be formed of a positive electrode collector plate and a positive electrode active material layer formed on the positive electrode collector plate, and the negative electrode plate can be formed of a negative electrode collector plate and a negative electrode active material layer formed on the negative electrode collector plate. The separator can be larger in width than the positive electrode active material layer and the negative electrode active material layer. With this configuration, if the separator is displaced from the positive electrode active material layer or the negative electrode active material layer, the separator can be interposed between the positive electrode active material layer and the negative electrode active material layer.

The second protruding portion can give the restraint force to an edge of the separator through the case. The separator can be contracted, for example due to heat production in the power-generating element associated with charge and discharge. The contraction of the separator can be prevented by using the second protruding portion to give the restraint force to the edge of the separator.

When the plurality of first protruding portions are provided on the restraint place, at least one of the first protruding portions can be placed along an edge of the first area. This allows the placement of the first protruding portions with the efficient use of the first area. When the plurality of second protruding portions are provided on the restraint plate, at least one of the second protruding portions can be placed along an edge of the second area. This allows the placement of the second protruding portions with the efficient use of the second area.

The power-generating element can be provided by winding the positive electrode plate, the negative electrode plate, and the separator around a predetermined axis. At least one of the first protruding portion and the second protruding portion can extend in a direction orthogonal to the direction in which the predetermined axis extends, in a plane including the first area and the second area. The length of the case in the direction in which the predetermined axis extends can be larger than the length of the case in the direction orthogonal to the predetermined axis in the plane including the first area and the second area.

A structure for giving the restraint force to the electric storage elements can be provided by using a pair of end plates and a coupling member. The pair of end plates can be placed at the positions where the plurality of electric storage elements are sandwiched in the predetermined direction. The coupling member can extend in the predetermined direction and can be fixed to the pair of end plates. This can shift the pair of end plates in a direction in which they are brought closer to each other to give the restraint force to the electric storage element.

The space formed by the protruding portion on the restraint plate can be used as a path in which a heat exchange medium for use in adjusting the temperature of the electric storage element is moved. When the electric storage element produces heat, a heat exchange medium for cooling can be used. When the electric storage element is cooled, a heat exchange medium for heating can be used. This can maintain the temperature of the electric storage element within a predetermined temperature range to suppress a reduction in input/output characteristics of the electric storage element.

MODE FOR CARRYING OUT THE INVENTION

An embodiment of the present invention will hereinafter be described.

Embodiment 1

Figure 1:
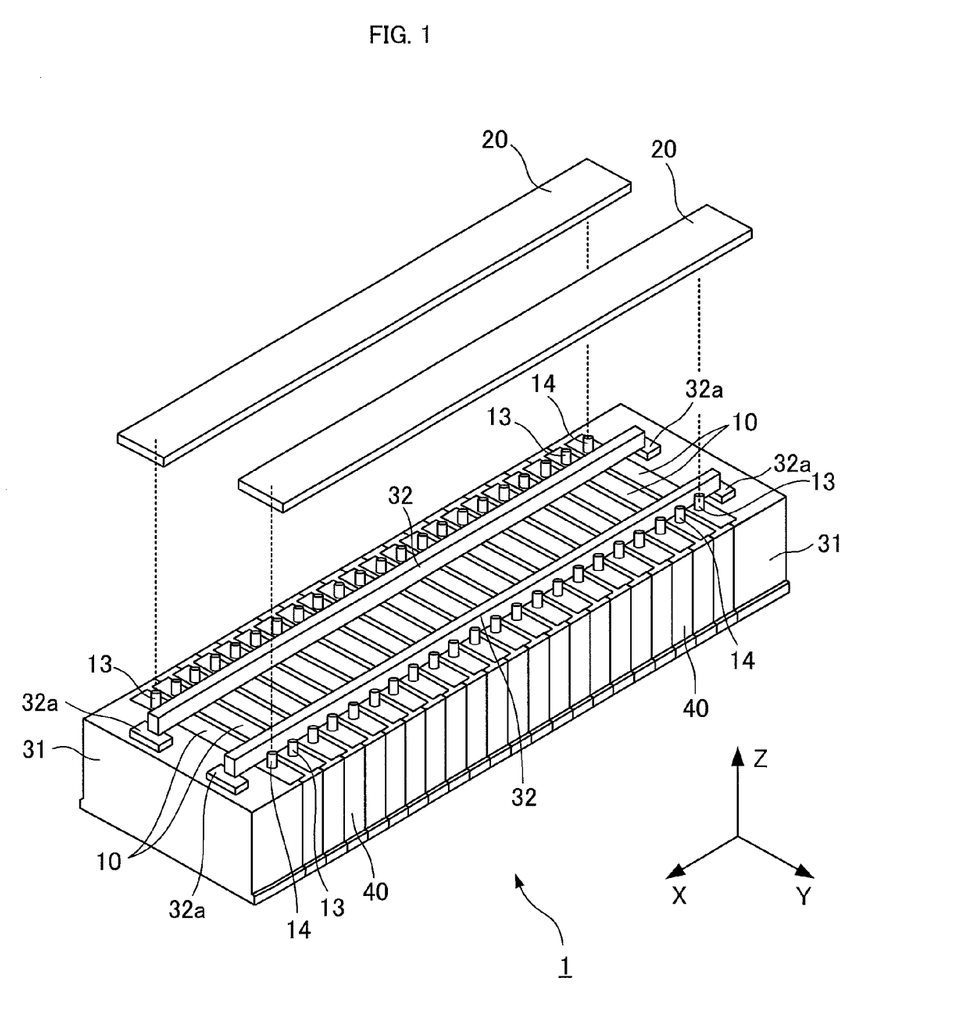
FIG. 1 An external view of a battery stack.

Description is now made of a battery stack (corresponding to an electric storage apparatus) which is Embodiment 1 of the present invention with reference to FIG. 1. FIG. 1 is an external view of the battery stack which is the present embodiment. In FIG. 1, an X axis, a Y axis, and a Z axis are axes orthogonal to each other, and the axis corresponding to a vertical direction is defined as the Z axis in the present embodiment. The relationship between the X axis, the Y axis, and the Z axis applies to the other figures.

The battery stack 1 shown in FIG. 1 can be mounted on a vehicle, for example. Examples of the vehicle include a hybrid vehicle and an electric vehicle. Such a vehicle can convert an electric energy output from the battery stack 1 into a kinetic energy which is used to run the vehicle. For mounting the battery stack 1 on the vehicle, the battery stack 1 can be housed into a stack case.

The battery stack 1 has a plurality of cells (corresponding to electric storage elements) 10, and the plurality of cells 10 are arranged along the X direction. The number of the cells 10 can be set as appropriate based on the output or the like required of the battery stack 1. A secondary battery such as a nickel metal hydride battery or a lithium-ion battery can be used as the cell 10. An electric double layer capacitor may be used instead of the secondary battery.

Figure 2:
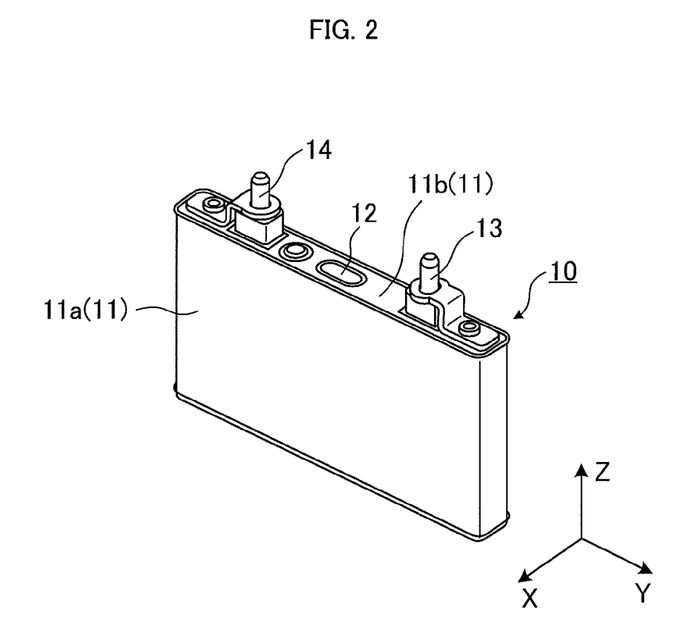
FIG. 2 An external view of a cell.

As shown in FIG. 2, the cell 10 has a battery case 11 which can be made of metal, for example. The cell 10 is of a so-called square type, and the battery case 11 of the square-type cell 10 has a shape conforming to a rectangular parallelepiped. In the present embodiment, the length of the battery case 11 in the Y direction is larger than the length of the battery case 11 in the Z direction.

The battery case 11 formed in this manner allows an increased size of the cell 10 (a power-generating element 15, later described) while reducing the height (length in the Z direction) of the cell 10. The reduced height of the cell 10 facilitates the mounting of the battery stack 1 on the vehicle. In addition, a lid 11b, later described, can be increased in size to allow the smooth attachment of parts (a valve 12, a positive electrode terminal 13, and a negative electrode terminal 14, later described) to the lid 11b.

Figure 3:
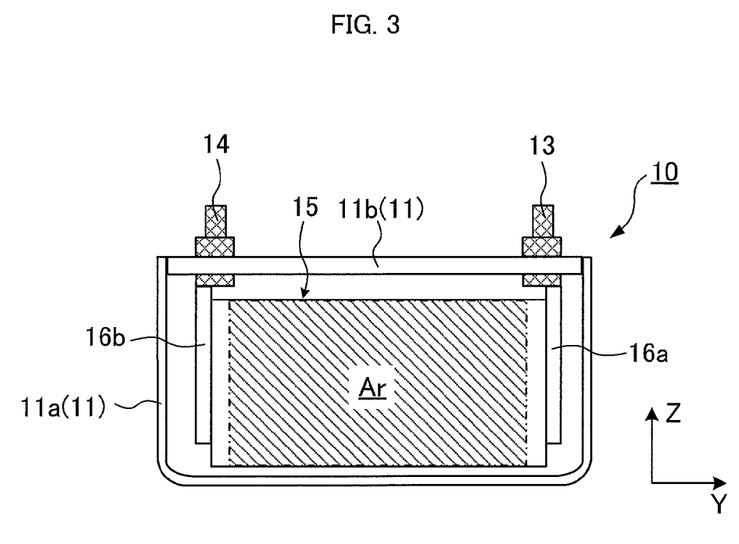
FIG. 3 A diagram showing the internal structure of the cell.

As shown in FIG. 3, the battery case 11 houses the power-generating element 15. The battery case 11 has a case body 11a and the lid 11b. The case body 11a has an opening portion for incorporating the power-generating element 15, and the lid 11b closes the opening portion of the case body 11a. This hermetically seals the battery case 11. The lid 11b and the case body 11a can be fixed by welding, for example.

As shown in FIG. 2, the valve 12 is provided in the lid 11b. When gas is produced within the battery case 11, the valve 12 is used to let out the gas to the outside of the battery case 11. Specifically, when the produced gas increases the internal pressure of the battery case 11 to the operating pressure of the valve 12, the valve 12 is changed from a closed state to an open state to let out the gas to the outside of the battery case 11.

The positive electrode terminal 13 and the negative electrode terminal 14 are fixed to the lid 11b. The positive electrode terminal 13 is connected to the power-generating element 15 through a positive electrode tab 16a, and the negative electrode terminal 14 is connected to the power-generating element 15 through a negative electrode tab 16b. The positive electrode terminal 13 extends through the lid 11b, and has a portion protruding outside the battery case 11 and a portion protruding into the battery case 11. The negative electrode terminal 14 extends through the lid 11b, and has a portion protruding outside the battery case 11 and a portion protruding into the battery case 11.

Figure 4:
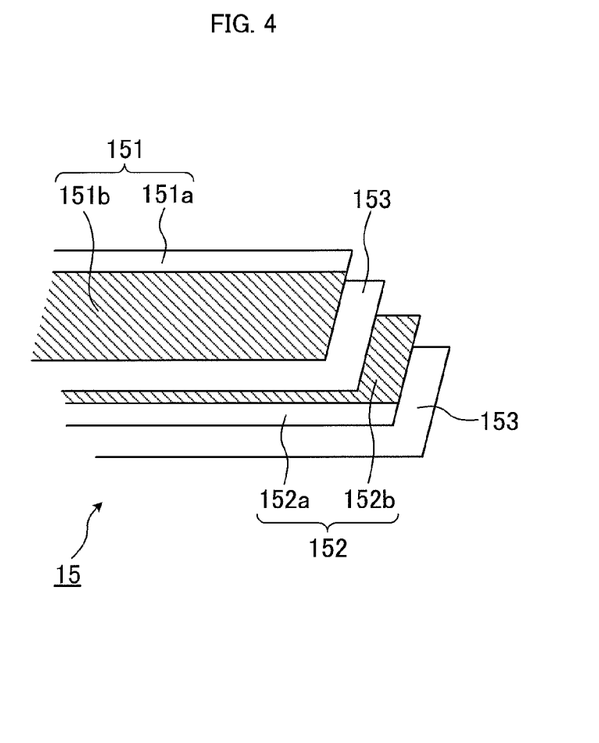
FIG. 4 A developed view of a power-generating element.

FIG. 4 is a developed view of the power-generating element 15. The power-generating element 15 has a positive electrode plate 151, a negative electrode plate 152, and a separator 153. The positive electrode plate 151 has a positive electrode collector plate 151a and a positive electrode active material layer 151b formed on a surface of the positive electrode collector plate 151a. The positive electrode active material layer 151b includes a positive electrode active material, a conductive agent, a binder and the like. The positive electrode active material layer 151b is formed on a region of the positive electrode collector plate 151a such that the remaining region of the positive electrode collector plate 151a is exposed. The positive electrode active material layer 151b can be formed on the surface of the positive electrode collector plate 151a by using an application apparatus such as a gravure coater or a die coater.

The negative electrode plate 152 has a negative electrode collector plate 152a and a negative electrode active material layer 152b formed on a surface of the negative electrode collector plate 152a. The negative electrode active material layer 152b includes a negative electrode active material, a conductive agent, a binder and the like. The negative electrode active material layer 152b is formed on a region of the negative electrode collector plate 152a such that the remaining region of the negative electrode collector plate 152a is exposed. The negative electrode active material layer 152b can be formed on the surface of the negative electrode collector plate 152a by using an application apparatus such as a gravure coater or a die coater. The positive electrode active material layer 151b, the negative electrode active material layer 152b, and the separator 153 are impregnated with an electrolytic solution.

Figure 5:
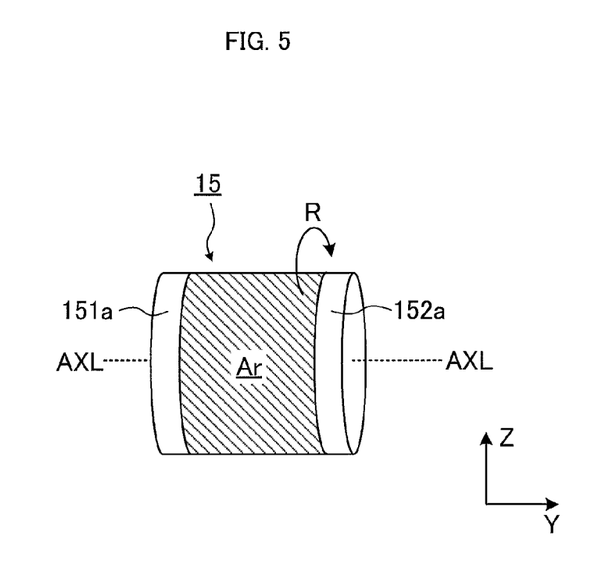
FIG. 5 An external view of the power-generating element.

The positive electrode plate 151, the negative electrode plate 152, and the separator 153 are stacked in the order shown in FIG. 4 and the stack is wound in a direction indicated by an arrow R in FIG. 5 to provide the power-generating element 15. The stack is wound under tension around an axis AXL extending in the Y direction. The edge of the winding can be fastened, for example with a tape. The stack wound around the axis AXL is deformed into a shape conforming to the battery case 11 so that the stack can be housed in the battery case 11.

In FIG. 5, at one end of the power-generating element 15 in the Y direction, only the positive electrode collector plate 151a is wound. The positive electrode tab 16a (see FIG. 3) is fixed to that positive electrode collector plate 151a. As shown in FIG. 3, one end of the positive electrode tab 16a is connected to the positive electrode terminal 13, and the other end of the positive electrode tab 16a is connected to the power-generating element 15 (positive electrode collector plate 151a). The positive electrode terminal 13 and the positive electrode tab 16a may be formed integrally.

In FIG. 5, at the other end of the power-generating element 15 in the Y direction, only the negative electrode collector plate 152a is wound. The negative electrode tab 16b (see FIG. 3) is fixed to that negative electrode collector plate 152a. As shown in FIG. 3, one end of the negative electrode tab 16b is connected to the negative electrode terminal 14, and the other end of the negative electrode tab 16b is connected to the power-generating element 15 (negative electrode collector plate 152a). The negative electrode terminal 14 and the negative electrode tab 16b may be formed integrally.

An area (referred to as a reaction area) Ar shown in FIG. 3 and FIG. 5 refers to the areas of the positive electrode active material layer 151b and the negative electrode active material layer 152b that are opposed to each other with the separator 153 interposed therebetween. A chemical reaction occurs in the reaction area Ar when the cell 10 (power-generating element 15) is charged or discharged. For example, in the charge of the lithium-ion secondary battery serving as the cell 10, lithium ions and electrons are released from the positive electrode active material layer 151b and absorbed by the negative electrode active material layer 152b. In the discharge of the lithium-ion secondary battery, the reaction reverse to that in the charge occurs in the positive electrode active material layer 151b and the negative electrode active material layer 152b.

Figure 6:
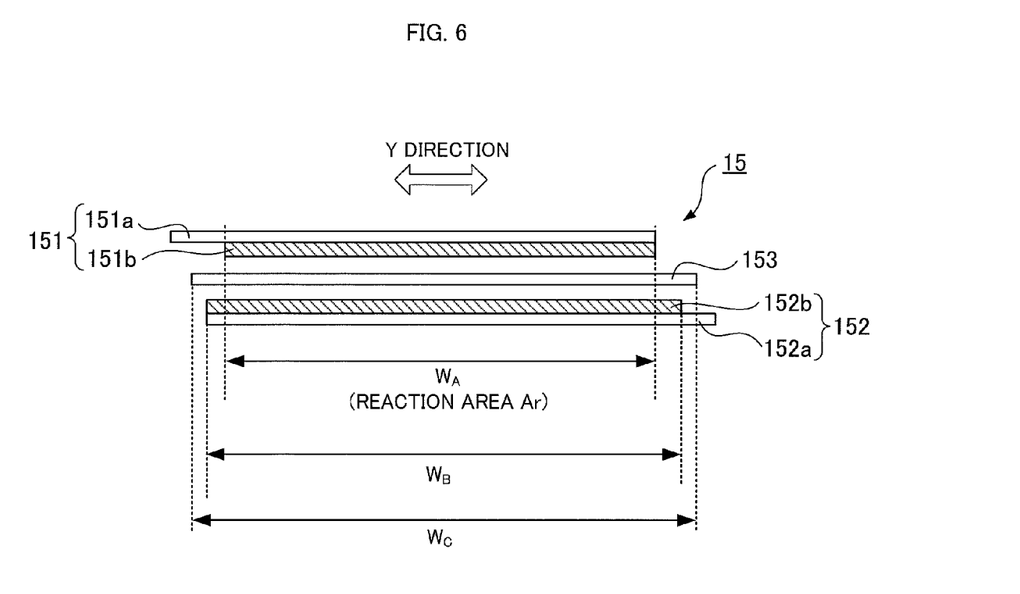
FIG. 6 A diagram for explaining a reaction area of the power-generating element.

FIG. 6 is a diagram showing the positional relationship between the positive electrode plate 151, the negative electrode plate 152, and the separator 153. The reaction area Ar refers to the areas of the positive electrode active material layer 151b and the negative electrode active material layer 152b that are overlapped to each other with the separator 153 interposed therebetween. The reaction area Ar has a width of $W_A$ in the Y direction. Since the positive electrode active material layer 151b has the smallest length (width) in the Y direction in the present embodiment, the width $W_A$ of the reaction area Ar corresponds to the width of the positive electrode active material layer 151b.

In FIG. 6, $W_B$ represents the length (width) of the negative electrode active material layer 152b in the Y direction, and the width $W_B$ is larger than the width $W_A$. $W_C$ represents the length (width) of the separator 153 in the Y direction, and the width $W_C$ is larger than the width $W_B$. Since the width $W_C$ of the separator 153 is larger than the width $W_A$ of the positive electrode active material layer 151b and the width $W_B$ of the negative electrode active material layer 152b, both end portions of the separator 153 in the Y direction protrude from the positive electrode active material layer 151b and the negative electrode active material layer 152b.

The width $W_C$ of the separator 153 larger than the width $W_A$ of the positive electrode active material layer 151b and the width $W_B$ of the negative electrode active material layer 152b allows the separator 153 to be interposed between the positive electrode active material layer 151b and the negative electrode active material layer 152b. This can prevent any direct contact between the positive electrode active material layer 151b and the negative electrode active material layer 152b.

Although the reaction area Ar is defined by the positive electrode active material layer 151b in the present embodiment, the present invention is not limited thereto. If the width $W_B$ of the negative electrode active material layer 152b is smaller than the width $W_A$ of the positive electrode active material layer 151b, the reaction area Ar is defined by the negative electrode active material layer 152b. Thus, the width of the reaction area Ar corresponds to the width $W_B$ of the negative electrode active material layer 152b.

The plurality of cells 10 arranged along the X direction in the battery stack 1 shown in FIG. 1 are connected electrically in series. Specifically, the positive electrode terminal 13 of one of the cells 10 is connected electrically to the negative electrode terminal 14 of another one of the cells 10 through a bus bar. The plurality of cells 10 may be connected electrically in parallel by changing the shape or the like of the bus bar as appropriate.

The present embodiment employs two bus bar modules 20 for electrically connecting the plurality of cells 10. Each of the bus bar modules 20 has a plurality of bus bars and a resin plate supporting the plurality of bus bars. The bus bar modules 20 can be used to connect the plurality of bus bars easily to the plurality of cells 10 (the positive electrode terminals 13 and the negative electrode terminals 14).

A pair of end plates 31 are placed at both ends of the battery stack 1 in the X direction. The pair of end plates 31 tightly hold the plurality of cells 10 in the X direction. A band (corresponding to a coupling member) 32 extends in the X direction and is fixed at both ends to the pair of end plates 31. Fixing portions 32 provided at both ends of the band 32 are fixed to the end plates 31. The fixing of the end plates 31 to the fixing portions 32a is performed, for example by fastening with bolts.

The band 32 can be made of metal, for example. In the present embodiment, the two bands 32 are placed over an upper face of the battery stack 1. Although not shown in FIG. 1, two bands 32 are also placed over a lower face of the battery stack 1.

The bands 32 can be fixed to the pair of end plates 31 to give a restraint force to the plurality of cells 10 constituting the battery stack 1. The restraint force refers to a force which tightly holds the plurality of cells 10 in the X direction. The restraint force given to the cells 10 can reduce the expansion of the cells 10, for example. In the lithium-ion secondary battery serving as the cell 10, since the power-generating element 15 is repeatedly expanded and contracted due to charge and discharge, the restraint force given to the cells 10 can suppress a reduction in input/output performance of the cells 10 (power-generating elements 15).

Although the present embodiment includes the two bands 32 placed over the upper face of the battery stack 1 and the two bands 32 placed over the lower face of the battery stack 1, the present invention is not limited thereto. The number of the bands 32 placed over the upper face and the lower face of the battery stack 1 can be set as appropriate. It is only required that the band 32 should be fixed to the pair of end plates 31 to give the restraint force to the cells 10. Alternatively, the band 32 may be replaced with a structure for shifting the pair of end plates 31 in a direction in which they are brought closer to each other. In this case, the restraint force can also be given to the cells 10.

A restraint plate 40 is placed between two of the cells 10 adjacent to each other in the X direction. The restraint plate 40 can be made of an insulating material such as resin, for example. The restraint plate 40 made of the insulating material can be used to provide insulation between the two cells 10 adjacent in the X direction.

Figure 7:
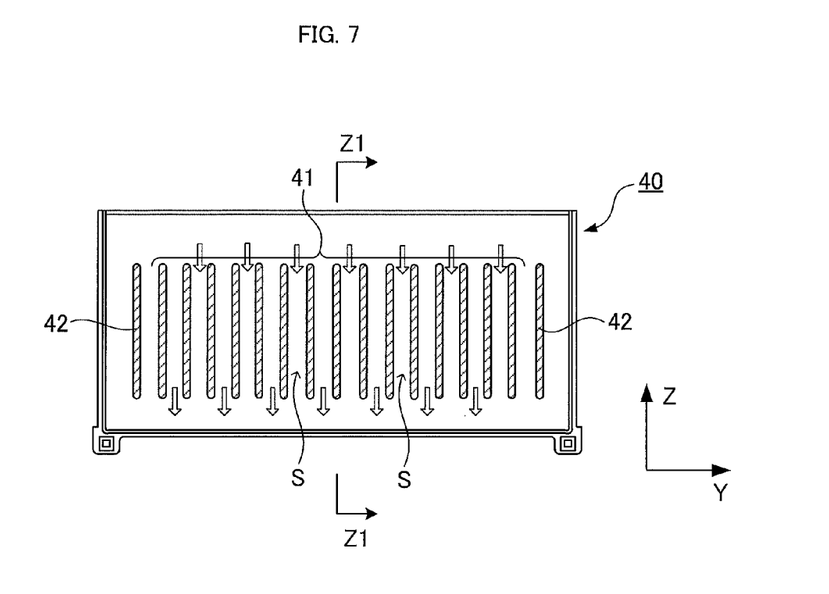
FIG. 7 A front view of a restraint plate.
Figure 8:
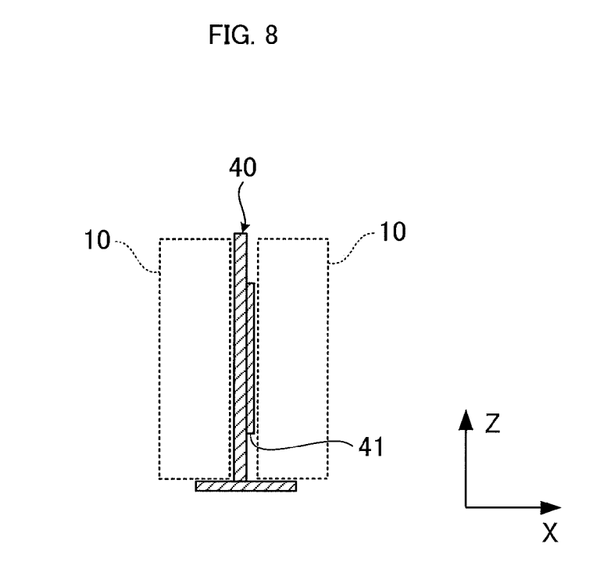
FIG. 8 A side view of the restraint plate.

FIG. 7 is a diagram of the restraint plate 40 viewed from the X direction, that is, a diagram (front view) of the restraint plate 40 when viewed from the cell 10. FIG. 8 is a sectional view taken along line Z1-Z1 in FIG. 7.

As shown in FIG. 7, the restraint plate 40 has a plurality of first protruding portions 41 and two second protruding portions 42. The first protruding portions 41 and the second protruding portions 42 are provided in the same plane (Y-Z plane) of the restraint plate 40 and protrude in the X direction. The plane of the restraint plate 40 in which the first protruding portions 41 and the second protruding portions 42 are provided is opposite to the cell 10 in the X direction.

The first protruding portion 41 and the second protruding portion 42 extend in the Z direction. In other words, the first protruding portion 41 and the second protruding portion 42 extend in the direction (Z direction) orthogonal to the direction (Y direction) in which the axis AXL (see FIG. 5) of the power-generating element 15 extends in the Y-Z plane.

The plurality of first protruding portions 41 are arranged along the Y direction. The two second protruding portions 42 are placed at the positions between which the plurality of first protruding portions 41 are sandwiched in the Y direction. In other words, the second protruding portions 42 are located closer to the outer edges of the restraint plate 40 than the first protruding portions 41 in the Y direction. The number of the first protruding portions 41 can be set as appropriate. The interval between two of the first protruding portions 41 adjacent in the Y direction can be set as appropriate.

As shown in FIG. 8, the first protruding portions 41 and the second protruding portions 42 are formed on only one of the faces of the restraint plate 40 in the X direction, and the other face of the restraint plate 40 is formed of a flat surface. In other words, in the configuration in which the restraint plate 40 is sandwiched between two cells 10 (the configuration shown in FIG. 8), the first protruding portions 41 and the second protruding portions 42 are formed only on the face of the restraint plate 40 opposite to one of those cells 10. The first protruding portions 41 and the second protruding portions 42 are not formed on the face of the restraint plate 40 opposite to the other cell 10. Alternatively, the first protruding portions 41 and the second protruding portions 42 may be formed on the face of the restraint plate 40 opposite to the other cell 10.

The end faces of the first protruding portions 41 and the second protruding portions 42 are in contact with the cell 10 (battery case 11) to form spaces S (see FIG. 7) between the restraint plate 40 and the cell 10. The space S is formed between two of the first protruding portions 41 adjacent in the Y direction. The space S serves as a space where air (corresponding to a heat exchange medium) moves for adjusting the temperature of the cell 10. The air for adjusting the temperature of the cell 10 can also be passed in a space formed between the first protruding portion 41 and the second protruding portion 42 adjacent in the Y direction.

When the cell 10 produces heat, air for cooling can be directed to the space S to suppress an increase in temperature of the cell 10. When the cell 10 is extremely cooled, air for heating can be directed to the space S to suppress a reduction in temperature of the cell 10. The temperature of the cell 10 can be maintained within a desired temperature range to prevent any deterioration of the input/output characteristics of the cell 10.

As shown in FIG. 7, the first protruding portion 41 extends in the Z direction to cause the air for temperature adjustment to flow in the Z direction along the first protruding portion 41. The length of the battery case 11 in the Z direction is smaller than the length of the battery case 11 in the Y direction. Thus, the passage of the air for temperature adjustment in the Z direction is preferable to the passage of the air for temperature adjustment in the Y direction.

If the air flow path is increased in length, the heat exchange in the upstream section may be likely to affect the downstream section to produce temperature variations along the air movement direction. Specifically, if the air is passed in the Y direction, the temperature may vary depending on the position in the Y direction within the cell 10. In contrast, the shorter air flow path can efficiently achieve the temperature adjustment for the cells 10 to suppress the temperature variations along the air movement direction.

When the air for temperature adjustment is supplied from the upper face of the battery stack 1, the air flows along the restraint plate 40 from top to bottom. During the movement of the air in the space S, heat exchange can be performed between the air and the cell 10 to adjust the temperature of the cell 10. The air after the temperature adjustment is let out through the lower face of the battery stack 1. On the other hand, when the air for temperature adjustment is supplied from the lower face of the battery stack 1, the air flows along the restraint plate 40 from bottom to top. The air after the temperature adjustment is let out through the upper face of the battery stack 1.

Although the air is used to adjust the temperature of the cell 10 in the present embodiment, the present invention is not limited thereto. A gas other than the air or a liquid can be used. When the liquid is used, an insulating one is preferably used. For the liquid, the path for moving the liquid needs to be hermetically sealed.

Figure 9:
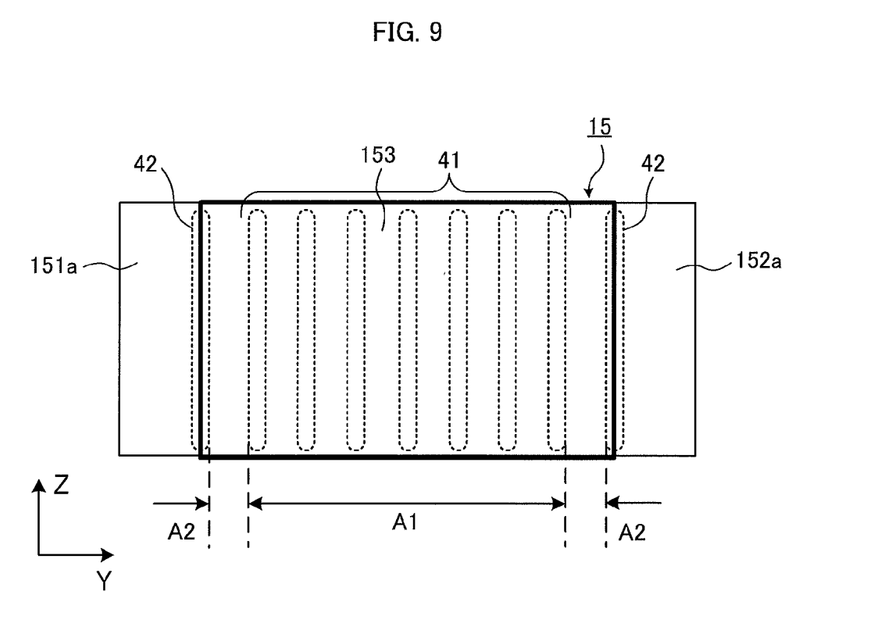
FIG. 9 A diagram for explaining the positions of a first protruding portion and a second protruding portion with respect to the power-generating element.

Next, description is made of the positions to provide the first protruding portions 41 and the second protruding portions 42. FIG. 9 is a diagram for explaining the positions of the first protruding portions 41 and the second protruding portions 42 with respect to the power-generating element 15. As shown in FIG. 9, the outer face of the power-generating element 15 is almost covered with the separator 153, and the positive electrode collector plate 151a and the negative electrode collector plate 152a are exposed at both ends of the power-generating element 15 in the Y direction. When the battery case 11 is omitted, the first protruding portions 41 and the second protruding portions 42 are placed at the positions shown in FIG. 9 with respect to the power-generating element 15.

The plurality of first protruding portions 41 are placed in a first area A1 and are used to give the restraint force to the reaction area Ar of the power-generating element 15. In the configuration shown in FIG. 9, two of the first protruding portions 41 are placed along the edges of the first area A1. The ends of the first protruding portions 41 are in contact with the area of the battery case 11 that corresponds to the first area A1.

The second protruding portions 42 are placed in second areas A2. In the configuration shown in FIG. 9, the second protruding portions 42 are placed along the edges of the second areas A2 and are placed along the edges of the separator 153. The ends of the second protruding portions 42 are in contact with the areas of the battery case 11 that corresponds to the second areas A2. The areas of the battery case 11 that correspond to the first area A1 and the second area A2 are located in the same plane (Y-Z plane).

Since the plurality of cells 10 are arranged along the X direction in the present embodiment, the cells 10 may be misaligned in manufacturing the battery stack 1. Specifically, the cells 10 may be displaced in the Y direction. The position variations between the cells 10 cause position variations between the reaction areas Ar of the power-generating elements 15 as shown in FIG. 10.

In the present embodiment, the first area A1 is set in view of the position variations between the reaction areas Ar. Specifically, as shown in FIG. 10, the first area A1 is defined as the area where all the reaction areas Ar are overlapped one another. The first area A1 is the area where all the reaction areas Ar are overlapped one another when the battery stack 1 is viewed from the X direction. The width of the first area A1 shown in FIG. 10 corresponds to the length in the Y direction.

The first area A1 can be determined by previously conducting an experiment or the like to specify a maximum displacement Dmax found when the reaction areas Ar are misaligned. The misalignment of the reaction areas Ar to be considered is the displacement of the reaction areas Ar in the Y direction (left-right direction in FIG. 10). The displacement Dmax can be determined on the basis of the reaction area Ar displaced furthest to the left in FIG. 10 (second row) and the reaction area Ar displaced furthest to the right in FIG. 10 (third row).

Figure 10:
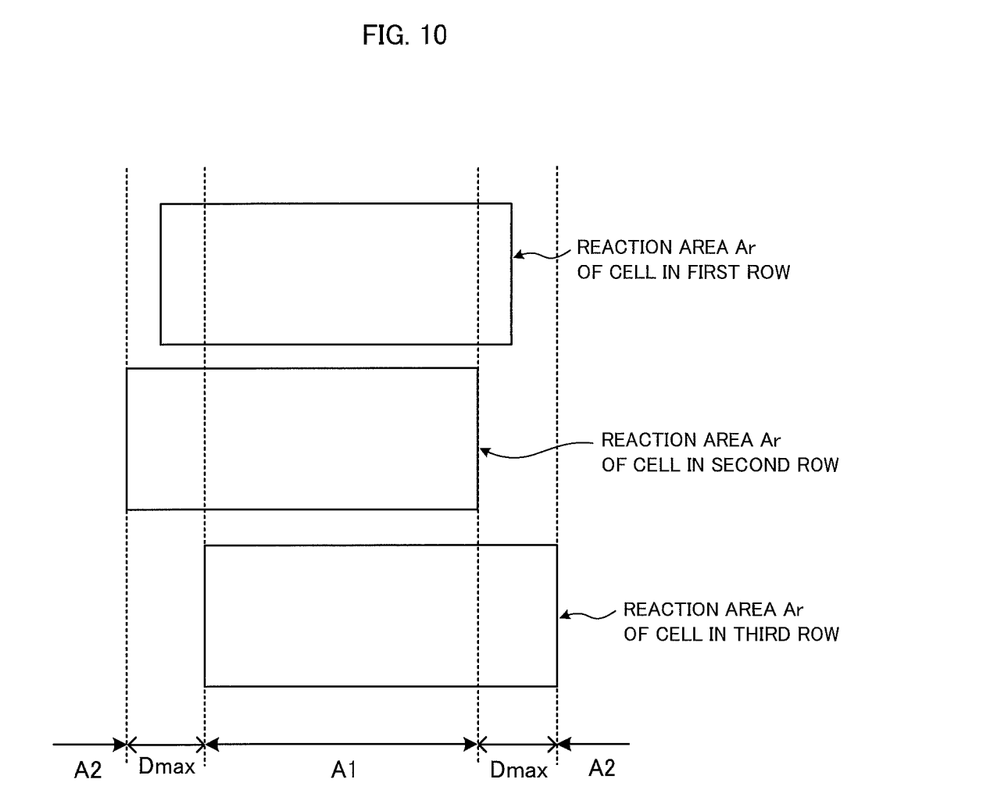
FIG. 10 A diagram for explaining the areas where the first protruding portion and the second protruding portion are placed.

Although the illustration in FIG. 10 considers the misalignment of the reaction areas Ar resulting from the misalignment of the cells 10, the present invention is not limited thereto. The misalignment of the reaction areas Ar may occur due to another factor.

In forming the positive electrode active material layer 151b on the surface of the positive electrode collector plate 151a, the positive electrode active material layer 151b may be displaced with respect to the positive electrode collector plate 151a depending on the characteristics of the application apparatus or the like. Since the reaction area Ar is defined by the positive electrode active material layer 151b in the present embodiment, the displacement of the positive electrode active material layer 151b with respect to the positive electrode collector plate 151a leads to the displacement of the reaction area Ar. In forming the negative electrode active material layer 152b on the surface of the negative electrode collector plate 152a, the negative electrode active material layer 152b may also be displaced with respect to the negative electrode collector plate 152a depending on the characteristics of the application apparatus or the like.

As described above, the power-generating element 15 is provided by stacking the positive electrode plate 151, the negative electrode plate 152, and the separator 153, and then winding the stack. The positive electrode plate 151 (positive electrode active material layer 151b) may be displaced in stacking the positive electrode plate 151 or winding the positive electrode plate 151. The displacement of the positive electrode active material layer 151b causes the displacement of the reaction area Ar. The negative electrode plate 152 (negative electrode active material layer 152b) may be displaced in stacking the negative electrode plate 152 or winding the negative electrode plate 152.

If the positive electrode active material layer 151b (reaction area Ar) is displaced during the manufacture of the cell 10, the resulting reaction area Ar is displaced even when the plurality of cells 10 are located without displacement during the assembly of the battery stack 1. The displacement of the reaction area Ar occurs during the assembly of the battery stack 1 or the manufacture of the cell 10, and is difficult to completely eliminate. Thus, only the cells 10 having the displacement of the reaction area Ar falling within an allowable range are used for the battery stack 1.

In the present embodiment, the first protruding portions 41 placed in the first area A1 can give the uniform restraint force to the reaction areas Ar of all the cells 10 (power-generating elements 15). As shown in FIG. 10, since the first area A1 overlaps with all the reaction areas Ar, the first protruding portions 41 placed in the first area A1 can equalize the restraint loads transferred from the first protruding portions 41 to the reaction areas Ar. This can provide equal restraint conditions to achieve the same input/output performance in all the cells 10.

If the first protruding portions 41 are placed in an area wider than the first area A1, the restraint force given to the reaction areas Ar may vary. Specifically, if the first protruding portion 41 is placed in an area outside the first area A1, one reaction area Ar receives the restraint force from the first protruding portion 41 but another reaction area Ar does not receive the restraint force. For example, when the first protruding portion 41 is placed in the area outside the first area A1 in FIG. 10, the restraint force from this first protruding portion 41 is given only to one of the reaction areas Ar in the second and third rows.

If only the first protruding portions 41 are placed in the first area A1, the restraint force is applied only to part of the cell 10 (battery case 11). The restraint force applied only to the first area A1 in the battery case 11 easily deforms the area of the battery case 11 except the first area A1. Since not only the first area A1 but also other areas on the surface of the battery case 11 receive the restraint force, the application of the restraint force only to the first area A1 deforms the other areas. When the battery case 11 is deformed, the restraint load transferred from the first protruding portion 41 to the power-generating element 15 is reduced accordingly.

To address this, as shown in FIG. 9, the second protruding portions 42 are provided in the second areas A2 in the present embodiment. The first protruding portion 41 and the second protruding portion 42 is not provided in the area located between the first area A1 and the second area A2. The second areas A2 are set in the area not overlapped with any reaction area Ar in view of the displacement of the reaction area Ar. Specifically, as shown in FIG. 10, the second areas A2 are located outside the most displaced reaction areas Ar (in the second and third rows).

The second protruding portions 42 placed in the second areas A2 can give the restraint force also to the second area A2 in the battery case 11. As a result, the restraint force can be given to the entire face of the battery case 11 which receive the restraint force, thereby giving the uniform restraint force to the entire battery case 11. This can suppress the deformation of part of the battery case 11 and thus prevent the reduction in restraint load due to the deformation of the battery case 11.

Since the second area A2 is located outside the reaction area Ar, the provision of the second protruding portion 42 in the second area A2 can avoid the application of the restraint force from the second protruding portion 42 to the reaction area Ar. In other words, only the restraint force from the first protruding portion 41 is applied to the reaction area Ar to maintain the uniform restraint force acting on all the reaction areas Ar.

When the first protruding portions 41 are placed only in the first area A1, the restraint force is insufficiently applied to the edges of the separator 153. In FIG. 9, the restraint force is insufficiently applied to the edges of the separator 153 overlapped with the second protruding portions 42.

Figure 11:
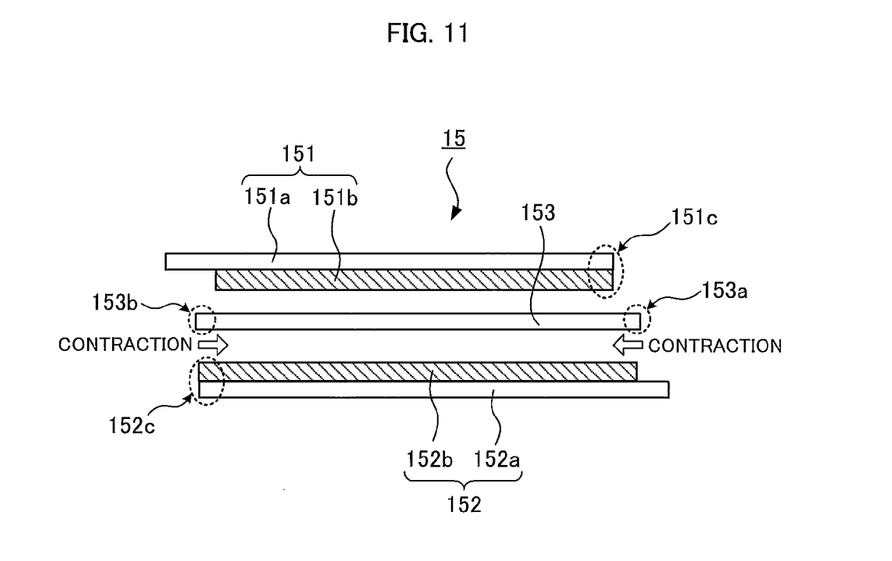
FIG. 11 A diagram for explaining the contraction of a separator.
Figure 12:
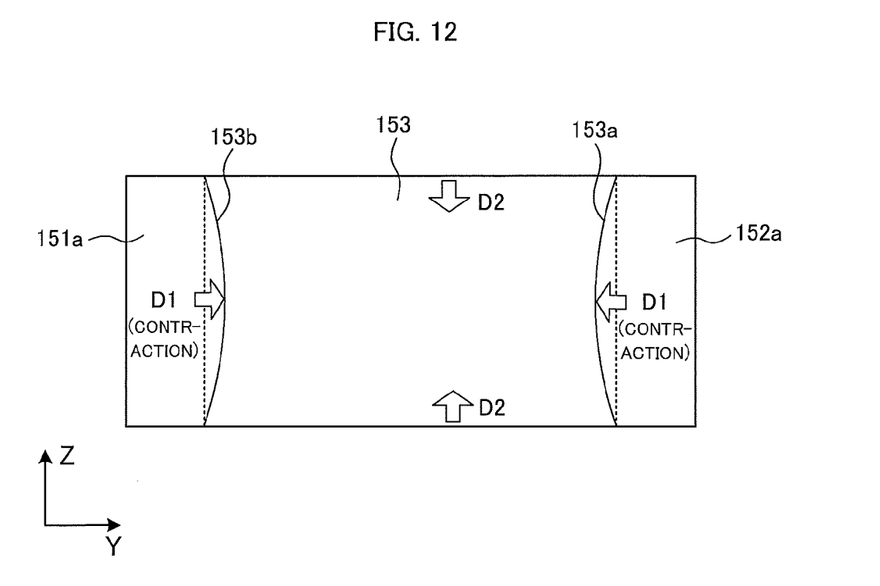
FIG. 12 A diagram for explaining the contraction of the separator.

Since the cell 10 (power-generating element 15) produces heat due to charge and discharge, the heat may contract the separator 153. If the restraint force is not applied to the edges of the separator 153, the contraction of the separator 153 displaces the edges of the separator 153 as shown in FIG. 11 and FIG. 12. Specifically, edges 153*a* and 153*b* of the separator 153 are displaced inwardly. Since the separator 153 is wound under tension, it is easily deformed in directions indicated by arrows D1 in FIG. 12 but is not easily deformed in directions indicated by arrows D2.

When the edge 153*a* of the separator 153 is deformed as shown in FIG. 11 and FIG. 12, an edge 151*c* (see FIG. 11) of the positive electrode plate 151 may be opposed to the negative electrode plate 152 without interposing the separator 153. When the edge 153*b* of the separator 153 is deformed as shown in FIG. 11 and FIG. 12, an edge 152*c* (see FIG. 11) of the negative electrode plate 152 may be opposed to the positive electrode plate 151 without interposing the separator 153.

As shown in FIG. 6, the edges 153*a* and 153*b* of the separator 153 are positioned outside the reaction area Ar, so that the second protruding portions 42 placed in the second areas A2 outside the reaction area Ar can be used to give the restraint force to the edges 153*a* and 153*b* of the separator 153. The restraint force given to the edges 153*a* and 153*b* of the separator 153 can suppress the deformation of the edges 153*a* and 153*b* as shown in FIG. 11 and FIG. 12.

The second protruding portions 42 placed in the second areas A2 can give the restraint force to the edges 153*a* and 153*b* of the separator 153 through the battery case 11. Thus, the second protruding portions 42 may not be overlapped with the edges (153*a* and 153*b*) of the separator 153 as shown in FIG. 9.

Although the second protruding portion 42 extends in the Z direction in the present embodiment, the present invention is not limited thereto. It is only required that the second protruding portion 42 should be placed in the second area A2. For example, the length of the second protruding portion 42 in the Z direction may be smaller than the length of the second protruding portion 42 shown in FIG. 7. As shown in FIG. 12, the edges 153*a* and 153*b* of the separator 153 are deformed most easily at the center in the Z direction.

For this reason, the second protruding portions 42 may be provided only at the positions where the edges 153*a* and 153*b* are easily deformed. In this case, the length of the second protruding portion 42 in the Z direction can be smaller than the length of the second protruding portion 42 shown in FIG. 7.

Although the first protruding portions 41 are placed over the entire first area A1 in the present embodiment, the present invention is not limited thereto. It is only required that the first protruding portions 41 should be placed in the first area A1, and the positions of the first protruding portions 41 in the first area A1 can be set as appropriate. For example, the first protruding portions 41 can be placed only at the edges of the first area A1 in the Y direction.

Although the second protruding portion 42 is placed in each of the two second areas A2 shown in FIG. 9 and FIG. 10 in the present embodiment, the present invention is not limited thereto. Specifically, the second protruding portion 42 may be placed in only one of the two second areas A2. In this case, the second protruding portion 42 can also give the restraint force to the edge of the separator 153 to suppress the deformation of the edge of the separator 153.

Although the stack of the positive electrode plate 151, the negative electrode plate 152, and the separator 153 is wound to provide the power-generating element 15 in the present embodiment, the present invention is not limited thereto. Specifically, the power-generating element 15 may be provided only by stacking the positive electrode plate 151, the negative electrode plate 152, and the separator 153. The first area A1 and the second area A2 can be defined for such a power-generating element 15 similarly to the present embodiment, and the first protruding portion 41 can be placed in the first area A1 and the second protruding portion 42 can be placed in the second area A2.

Although the first protruding portion 41 and the second protruding portion 42 extend in the Z direction as shown in FIG. 7 in the present embodiment, the shapes of the first protruding portion 41 and the second protruding portion 42 are not limited thereto. It is only required that the first protruding portion 41 should be placed in the first area A1 and the second protruding portion 42 should be placed in the second area A2.

Figure 13:
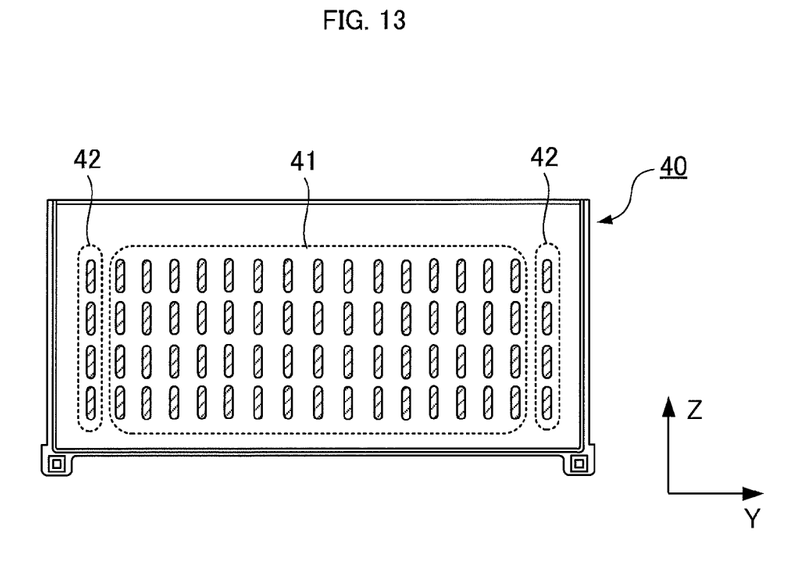
FIG. 13 A front view of the restraint plate which is Modification 1.
Figure 14:
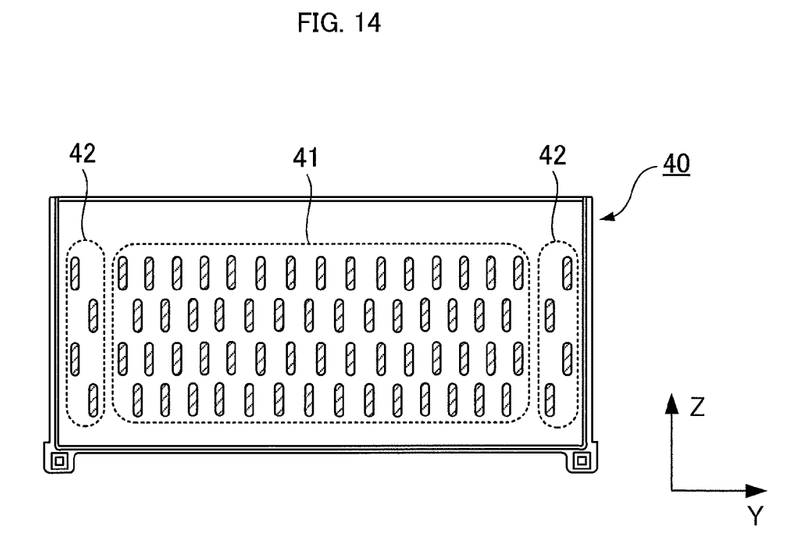
FIG. 14 A front view of the restraint plate which is Modification 2.

For example, the first protruding portions 41 and the second protruding portions 42 can be provided as shown in FIG. 13 and FIG. 14. In the configuration shown in FIG. 13, the plurality of first protruding portions 41 are arranged along the Z direction and the Y direction in the first area A1. The plurality of second protruding portions 42 are arranged along the Z direction in the second area A2. The numbers of the first protruding portions 41 and the second protruding portions 42 arranged along the Z direction can be set as appropriate. Similarly, the number of the first protruding portions 41 arranged along the Y direction can be set as appropriate.

In the configuration shown in FIG. 14, the plurality of first protruding portions 41 are arranged along the Y direction in the first area A1. The plurality of first protruding portions 41 of one row in an upper stage are shifted in the Y direction from the plurality of first protruding portions 41 of one row in a lower stage. Two second protruding portions 41 are arranged along the Z direction in the second area A2. Columns (two columns) each including the two second protruding portions 42 arranged along the Z direction are shifted in the Z direction.

Figure 15A:
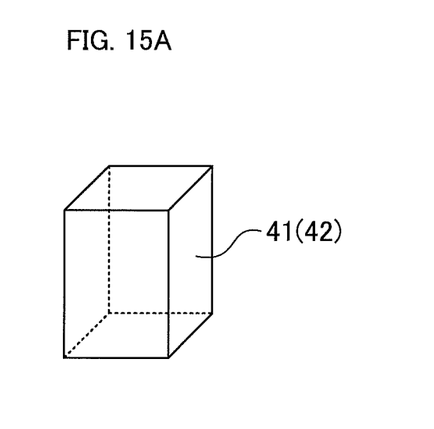
FIG. 15A An external view of the first protruding portion and the second protruding portion.
Figure 15B:
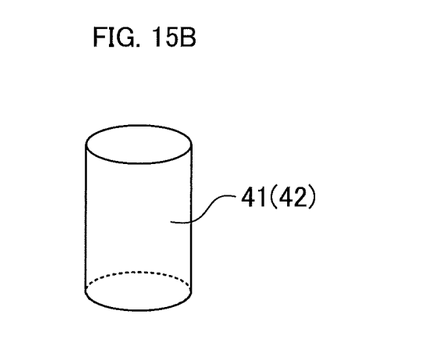
FIG. 15B An external view of the first protruding portion and the second protruding portion in Modification 1.
Figure 15C:
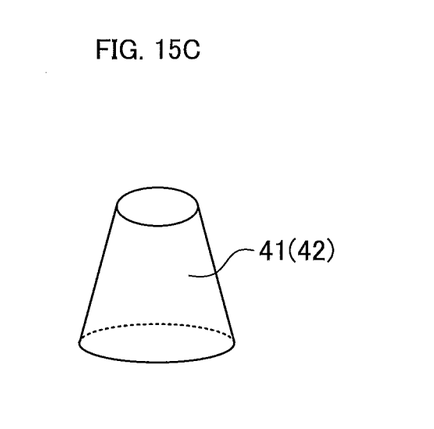
FIG. 15C An external view of the first protruding portion and the second protruding portion in Modification 2.

In the configurations shown in FIG. 13 and FIG. 14, the first protruding portion 41 and the second protruding portion 14 can be formed in any of shapes shown in FIG. 15A to FIG. 15C. FIG. 15A to FIG. 15C show the examples of the outer shape of the first protruding portion 41 (or the second protruding portion 42). In FIG. 15A, the first protruding portion 41 (or the second protruding portion 42) is formed in a rectangular parallelepiped. In FIG. 15B, the first protruding portion 41 (or the second protruding portion 42) is formed in a cylinder. In FIG. 15C, the first protruding portion 41 (or the second protruding portion 42) is formed in a frustum of a cone.

When a protruding portion extending in the Y direction is provided on the restraint plate 40, the displacement of the reaction areas Ar does not need to be considered. If the reaction areas Ar are displaced in the Y direction as shown in FIG. 10, the protruding portion extending in the Y direction can be used to give the uniform restraint force to all the reaction areas Ar. The protruding portion extending in the Y direction is placed over both the first area A1 and the second area A2. The present invention is preferably used when the protruding portion (the first protruding portion 41 and the second protruding portion 42) is provided for each of the first area A1 and the second area A2.

The shapes of the first protruding portion 41 and the second protruding portion 42 are not limited to the shapes shown in FIG. 15A to FIG. 15C. It is only required that the first protruding portion 41 and the second protruding portion 42 should protrude in the X direction.

The invention claimed is:

1. An electric storage apparatus comprising:
   a plurality of electric storage elements placed side by side along a predetermined direction, each of the plurality of electric storage elements having a power-generating element for performing charge and discharge and a case housing the power-generating element, the power-generating element including a reaction area; and
   a restraint plate having a plurality of protruding portions, the plurality of protruding portions giving a restraint force to one of the plurality of electric storage elements and being in contact with the case adjacent to the restraint plate to form a space between the restraint plate and one of the plurality of electric storage elements, the restraint plate being placed between two of the plurality of electric storage elements adjacent to each other in the predetermined direction,
   wherein the power-generating element has a positive electrode plate, a negative electrode plate, and a separator placed between the positive electrode plate and the negative electrode plate, and a chemical reaction associated with the charge and discharge occurs in the reaction area,
   wherein the reaction areas of a plurality of the power-generating elements are misaligned in a lateral direction of each of the plurality of electric storage elements orthogonal to the predetermined direction, and
   the plurality of protruding portions each having:
      a first protruding portion in contact with a first area of the case adjacent to the restraint plate, the first area being an area where all of the reaction areas of the plurality of electric storage elements are overlapped with one another in the predetermined direction; and
      a second protruding portion in contact with a second area of the case adjacent to the restraint plate, the second area opposite to an area of the power-generating element adjacent to the restraint plate except the reaction area, the second area being not opposite to all of the reaction areas of the plurality of electric storage elements,
   wherein the plurality of electric storage elements are not misaligned in the lateral direction orthogonal to the predetermined direction.

2. The electric storage apparatus according to claim 1, wherein the positive electrode plate has a positive electrode collector plate and a positive electrode active material layer formed on the positive electrode collector plate,
   the negative electrode plate has a negative electrode collector plate and a negative electrode active material layer formed on the negative electrode collector plate, and
   the separator is larger in width than the positive electrode active material layer and the negative electrode active material layer.

3. The electric storage apparatus according to claim 2, wherein the second protruding portion gives a restraint force to an edge of the separator through the case.

4. The electric storage apparatus according to claim 1, wherein the first protruding portion comprises a plurality of the first protruding portions, and
   at least one of the plurality of first protruding portions is placed along an edge of the first area.

5. The electric storage apparatus according to claim 1, wherein the second protruding portion comprises a plurality of the second protruding portions, and
   at least one of the plurality of second protruding portions is placed along an edge of the second area.

6. The electric storage apparatus according to claim 1, wherein the power-generating element is provided by winding the positive electrode plate, the negative electrode plate, and the separator around a predetermined axis.

7. The electric storage apparatus according to claim 6, wherein at least one of the first protruding portion and the second protruding portion extends in a direction orthogonal to a direction in which the predetermined axis extends, in a plane including the first area and the second area.

8. The electric storage apparatus according to claim 6, wherein a length of the case in the direction in which the predetermined axis extends is larger than a length of the case in the direction orthogonal to the predetermined axis in the plane including the first area and the second area.

9. The electric storage apparatus according to claim 1, further comprising a pair of end plates placed at positions where the plurality of electric storage elements are sandwiched in the predetermined direction; and
   a coupling member extending in the predetermined direction and fixed to the pair of end plates.

10. The electric storage apparatus according to claim 1, wherein the space is a path in which a heat exchange medium for use in adjusting a temperature of the electric storage element is moved.

* * * * *